United States Patent [19]

Bambenek et al.

[11] Patent Number: 4,462,620
[45] Date of Patent: Jul. 31, 1984

[54] MOTOR VEHICLE FILL PIPE TO FUEL TANK CONNECTOR

[75] Inventors: Charles L. Bambenek, Farminton Hills; Craig W. Lewitzke, Dearborn, both of Mich.

[73] Assignee: Ford Motor Company, Dearborn, Mich.

[21] Appl. No.: 282,119

[22] Filed: Jul. 10, 1981

[51] Int. Cl.³ .......................... F16L 5/00; F16L 25/00
[52] U.S. Cl. .................................. 285/162; 285/194; 285/423; 285/DIG. 22; 220/86 R; 277/212 F
[58] Field of Search ............... 285/162, 192, 194, 423, 285/DIG. 22; 220/86 R; 277/178, 212 F

[56] References Cited

U.S. PATENT DOCUMENTS

| | | | |
|---|---|---|---|
| 2,514,504 | 7/1950 | Moline . | |
| 3,033,624 | 5/1962 | Biesecker . | |
| 3,334,779 | 8/1967 | Smith | 220/86 R |
| 3,514,129 | 5/1970 | Holdren . | |
| 4,041,241 | 8/1977 | Olmstead et al. | 277/178 |
| 4,088,241 | 5/1978 | Hall et al. . | |
| 4,323,166 | 4/1982 | Maeroff | 285/162 X |

Primary Examiner—Richard J. Scanlan, Jr.
Attorney, Agent, or Firm—Robert E. McCollum; Clifford L. Sadler

[57] ABSTRACT

An automotive type fuel tank-filler pipe connector consists of a one-piece flexible grommet having relatively rigid inserts embedded in the wall of the grommet and extending axially, the inserts comprising a number of flexible finger-like elements circumferentially separated but joined at one end by a chamfered nose portion, insertion of the grommet into a fuel tank opening being accomplished by the deformation of the nose portions being permitted by the radial inward collapsing of the fingers, passage of the nose portion past the tank opening returning the fingers outwardly; the insertion of the fill pipe camming the fingers further outwardly to clamp against the pipe, a further screw type hose clamp further clamping the grommet to the pipe.

6 Claims, 4 Drawing Figures

MOTOR VEHICLE FILL PIPE TO FUEL TANK CONNECTOR

This invention relates in general to a motor vehicle type fuel tank assembly. More particularly, it relates to a combination seal and attachment for connecting the fuel filler pipe to the fuel tank.

In the past, in many instances, the fuel filler pipe was connected to the fuel tank merely by a simple rubber grommet inserted through the fuel tank opening and clamped to the filler pipe by means of a screw type hose clamp.

This invention relates to a combination seal and attachment for the lower end of a filler pipe that provides excellent sealing between the tank and the filler pipe while at the same time providing a high resistive force to separation of the two. This is accomplished by embedding a number of flexible but relatively rigid finger-like members in the body of the grommet that provide an additional clamping force on the filler pipe after assembly of the pipe to the tank.

Pipe clamps are well-known for securing a pipe within an opening in a plate-like structure. For example, Moline, U.S. Pat. No. 2,514,504 shows a two-piece pipe clamp consisting of two cylindrical members, one of which has a number of flexible fingers for frictionally engaging the other member to clamp the pipe within a plate structure. The clamp, however, is a two-piece construction that can separate as compared to the one-piece construction of the invention.

Holdren, U.S. Pat. No. 3,514,129, shows a connector 34 with flexible fingers 42 that cooperate with a second locking member 46 that is rotated to cam the members apart for engagement in the opening of a tank 10. Again, the connector is a two-piece structure that inherently can tend to separate after assembly.

Biesecker, U.S. Pat. No. 3,033,624, shows a one-piece connector having a chamfered nose portion and an internal bead cooperating with a groove in the piece to be connected for axially locating the two. In this case, the force tending to separate the two would be low in contrast to the high resistive force provided by the connector of the invention.

Hall et al, U.S. Pat. No. 4,088,241, shows a gasoline tank-filler pipe grommet connector having flexible fingers 30 formed as an extension of the grommet for frictionally engaging the pipe inserted within the grommet. Here, only a low force would be required to separate the pipe from the grommet and the fuel tank.

It is, therefore, a primary object of the invention to provide a fuel tank-filler pipe connector and seal of a one-piece construction providing a high resistance to separation of the tank and filler pipe once the connector is assembled.

It is another object of the invention to provide a connector of the type described consisting of a one-piece flexible grommet having embedded therein a relatively rigid but flexible finger-like member facilitating assembly of the grommet within the tank opening while providing a high resistance to separation of the filler pipe from the tank.

It is a still further object of the invention to provide a connector as described consisting of a one-piece rubber-like grommet molded around a number of plastic finger-like inserts that extend axially for essentially the length of the grommet to project outwardly from one end of it into abutment with a bead on the filler pipe for axially locating the pipe within the grommet and fuel tank opening, the finger-like members being equally spaced circumferentially from one another at one end and joined by a thin annular strap, the members having a nose-like portion at the opposite end with a chamfered ramp surface for ease of insertion through the tank opening, the latter movement being permitted by the radial inward flexing or camming of the opposite ends of the members, the members moving or being cammed radially outwardly upon insertion of the filler pipe through the grommet to provide a strong frictional clamping of the grommet around the filler pipe, and including further screw-type clamping means to additionally engage the grommet with the filler pipe.

Other objects, features and advantages of the invention will become more apparent upon reference to the succeeding detailed description thereof, and to the drawings illustrating the preferred embodiment thereof; wherein, FIG. 1 is a perspective view of an automotive type fuel tank assembly embodying the invention;

Figure 1:
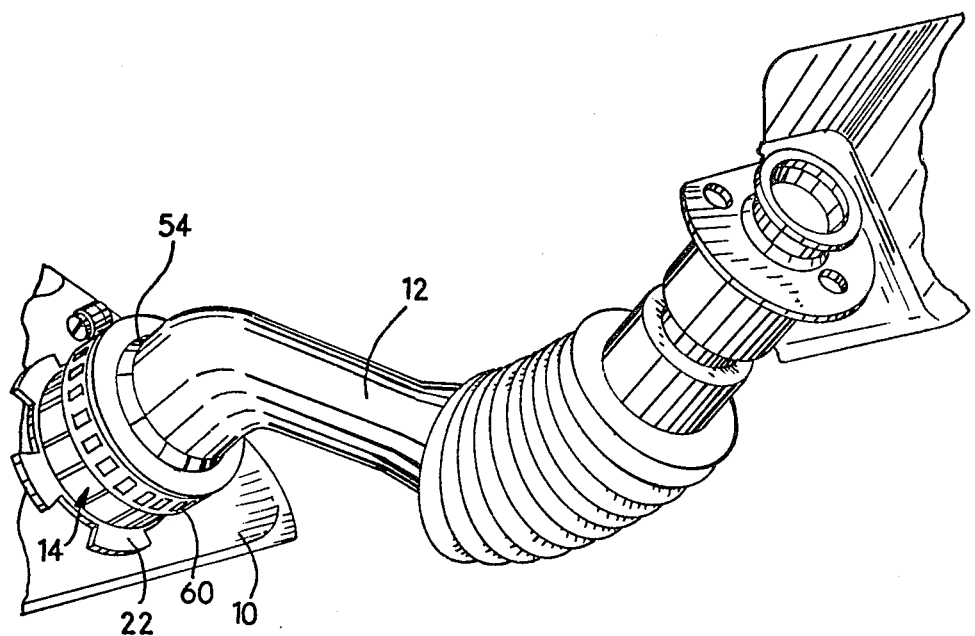

FIG. 1 shows an assembly of an automotive type fuel tank 10 and a fuel filler pipe 12 connected by a one-piece combination seal and attachment 14. As seen more clearly in FIGS. 2-4, the attachment consists of a one-piece tubular rubber grommet 16 of essentially constant internal diameter. It has an external diameter or surface 18 that is stepped to provide a flared end portion 20, a locking lug portion 22, and a fuel tank wall opening engaging portion 24.

Embedded in the body wall of the rubber grommet are six relatively rigid nylon inserts 26. Each consists of a chamfered nose portion 28 formed integral with a finger-like extension 32 that projects axially from the nose portion. The nose portion, as well as the finger portions, all are equally spaced circumferentially from one another, the nose portions being joined by a continuous inner surface base portion while the finger-like elements are joined by an additional thin strap 34. In this case, the rubber grommet actually would be molded around the nylon inserts, the back face 36 of the nose portion 28 forming with the front face 37 of locking lug 22 an annular groove 38 in the rubber grommet outer surface. The groove would receive the rounded edge 40 of the wall of the fuel tank when the grommet is in the assembled position, as shown in FIG. 4, for example.

Figure 3:
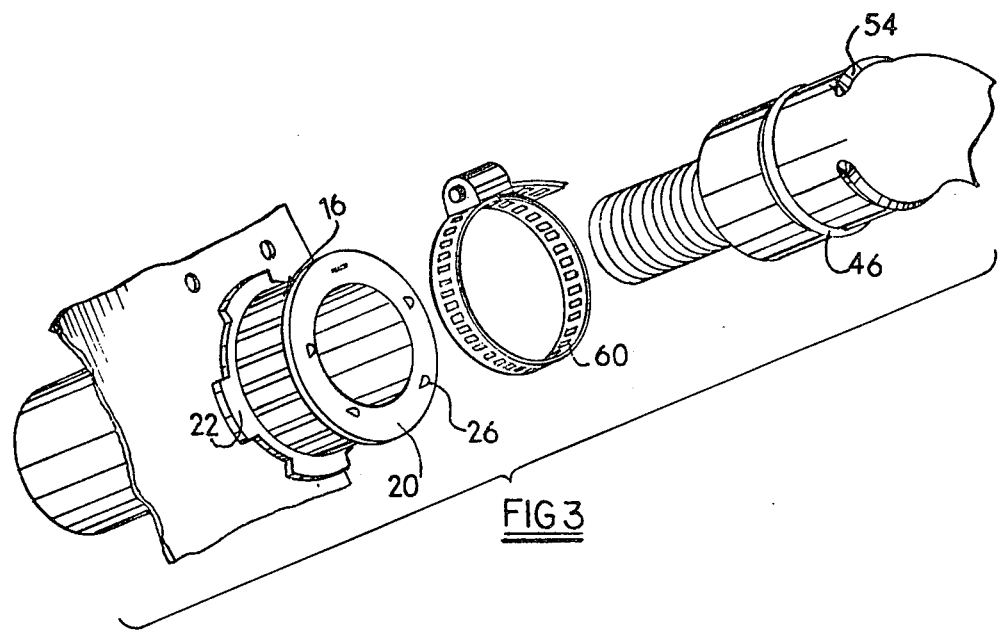
FIG. 3 is a exploded perspective view of portions of the FIG. 2 showing.
Figure 4:
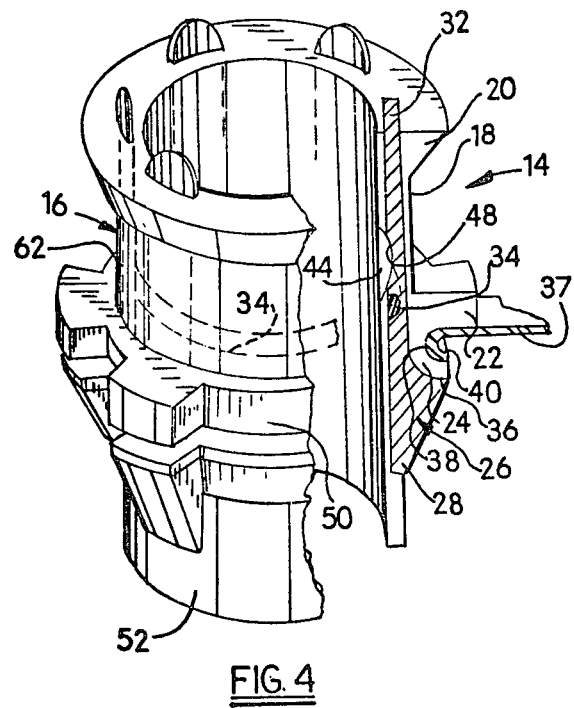
FIG. 4 is an elevational view with parts broken away and in section of a portion of the FIG. 2 showing.

Flexible fingers 32 in this case extend or project beyond the flared end 16 of the rubber grommet, as shown in FIGS. 3 and 4, for a purpose to be described later. The internal surface of the grommet has an annular recess or groove 44 that constitutes a detent for cooperation with a first annular beaded portion 46 formed on fuel filler pipe 12 as shown in FIG. 3. Each of the finger-like members 32 likewise is formed with a mating recessed annular groove-like portion 48 for the same purpose.

As will be seen more clearly in FIGS. 3 and 4, locking lug portion 22 consists of an equal number of circumferentially spaced tabs projecting radially from the grommet with circumferential connecting portions 50 of lesser diameter to permit circumferential and axial flexibility of each lug portion with respect to the fuel tank wall during assembly of the grommet into the fuel tank opening. The circumferentially separated nose portions are also constructed in this manner for a similar purpose.

In operation, the one-piece grommet 16 initially is assembled into the tank opening by inserting the lower end 52 into the tank opening defined by wall edge 40. The grommet then is steadily pushed axially downwardly after nose portions 28 have engaged the tank wall edge. This causes a radially inward force to be exerted on the nose portions 28 camming the finger-like members 32 radially inwardly towards one another, which is permitted by the circumferential spacing of the fingers. This inward flexing of the fingers permits the nose portions to be deformed inwardly sufficient to clear the edge 40 of the fuel tank wall opening and thus permit the edge of the fuel tank wall to fall into the groove 38 of the grommet, as shown in FIG. 4, with the locking lugs 22 abutting or contiguous to the outer surface of the fuel tank wall. After this occurs, that is, when the nose portions have passed through the opening of the fuel tank, the flexible finger portions 32 will return radially outwardly to some extent by their natural resiliency.

Figure 2:
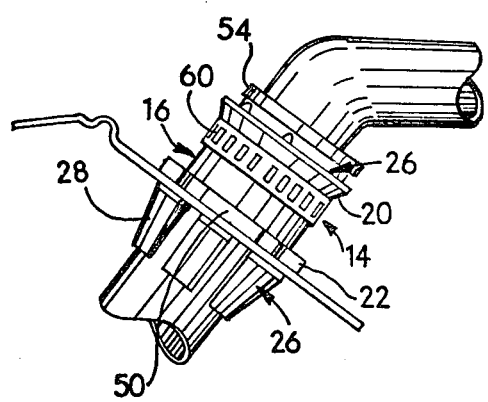
FIG. 2 is a side elevational view of a portion of the FIG. 1 showing.

Thereafter, when filler pipe 12 is inserted into the top portion 16 of the grommet, the flexible fingers 32 will be forced radially outwardly to the diameter of the pipe. This results in a much greater required force to pull the grommet out of the fuel tank as compared with conventional grommets without the relatively rigid inserts molded into the grommet as in this invention. Filler pipe 12 is located axially in the fuel tank then by being moved continuously downwardly through the grommet until the second annular bead portion 54 is engaged by the ends of the upstanding or projecting portions of the finger elements 32, as seen in FIG. 2. At this point, the lower smaller bead portion 46 will have engaged in the annular groove 44 in the grommet and nylon inserts. A hose type screw clamp 60 is then assembled around the grommet in the space 62 between the flared upper flange 20 and the back surface of the locking lugs 22, the curvatures of the flared portions and locking lugs resisting axial displacement of the screw clamp once assembled. The screw clamp thus provides a force clamping the grommet to the filler pipe over the beaded portion 46 on the filler pipe that is in addition to the force of the finger-like members 32 flexibly bearing radially against the pipe.

While the invention has been shown and described in its preferred embodiment, it will be clear to those skilled in the arts to which it pertains that many changes and modifications may be made thereto without departing from the scope of the invention.

We claim:

1. A combination seal and attachment for connecting a fuel fill pipe to a motor vehicle type fuel tank comprising, a tubular grommet of resilient deformable material having one end insertable into an opening in the fuel tank and receiving a fuel fill pipe therein of comparable diameter for connecting and sealing the pipe to the tank; a flexible finger-like member of less resiliency than the grommet embedded in the grommet between the inner and outer radial surfaces thereof providing rigidity to the grommet, the finger-like member extending coaxially of the grommet; the grommet having an annular groove in its outer surface adapted to receive therein the edge of a fuel tank wall defining an opening, the finger-like member having a nose portion with a chamfered surface at one end extending radially beyond the grommet for engagement by the edge of the fuel tank wall upon axial passage of the grommet through the opening, passage of the nose portion of the finger-like element through the wall opening in one direction in the absence of the fill pipe being received in the grommet camming the finger-like member radially inwardly to a diameter less than that of the fill pipe and wall opening to permit passage of the nose portion axially past the opening, the nose portion having a one-way locking surface contiguous thereto and engageable with the tank wall edge resisting return movement of the ramp surface in the opposite direction subsequent to passage of the nose portion in the one direction through the opening, the axial sliding insertion of the fill pipe through the grommet engaging the lower edge of the fill pipe with the inwardly located finger-like member forcing the same radially outwardly to engage the locking surface with the tank wall edge, and clamp means to clamp the grommet to the fill pipe to resist relative movement therebetween.

2. A combination seal and attachment as in claim 1, including a plurality of flexible finger-like members equally spaced circumferentially from one another around the grommet, the ends of the members adjacent one end of the grommet collapsing towards the axis upon insertion of the nose portion through the opening to permit the insertion, the resiliency of the members and grommet returning the members radially outwardly upon completion of passage of the nose portion through the wall opening.

3. A combination seal and attachment as in claim 2, the internal wall surface of the grommet having a detent-type annular second groove formed therein, the fill pipe having a bead thereon receivable in the detent upon insertion of the fill pipe through the grommet to axially locate the pipe and grommet relative to each other.

4. A combination seal and attachment as in claim 3, the ends of the finger-like members projecting axially beyond the end of the grommet, the fill pipe having a second bead thereon axially spaced from the first bead and engageable against the projecting ends of the members to constitute a stop against further insertion of the pipe through the grommet, engagement of the second bead against the ends of the members locating the first bead in the detent.

5. A combination seal and attachment as in claim 2, the finger-like members being plastic permitting flexing.

6. A combination seal and attached as in claim 3, the members each including an annular groove on its internal surface constituting a detent mating with the detent in the grommet.

* * * * *